SUPERCONDUCTIVE INFORMATION HANDLING ARRANGEMENT

Filed May 2, 1960 3 Sheets-Sheet 1

JOHN L. ROGERS
HORACE T. MANN
*INVENTORS.*

BY Jerry A. Dinardo
AGENT.

Albert Rosen
ATTORNEY

SUPERCONDUCTIVE INFORMATION HANDLING ARRANGEMENT

Filed May 2, 1960 3 Sheets-Sheet 2

JOHN L. ROGERS
HORACE T. MANN
*INVENTORS.*

BY Jerry A. Dinardo
AGENT.

Albert Rosen
ATTORNEY.

JOHN L. ROGERS
HORACE T. MANN
*INVENTORS.*
*BY* Jerry A. Dinardo
AGENT.
Albert Rosen
ATTORNEY.

United States Patent Office 3,164,808
Patented Jan. 5, 1965

3,164,808

SUPERCONDUCTIVE INFORMATION HANDLING ARRANGEMENT

John L. Rogers, Hermosa Beach, and Horace T. Mann, Palos Verdes Estates, Calif., assignors, by mesne assignments, to Thompson Ramo Wooldridge Inc., Cleveland, Ohio, a corporation of Ohio Filed May 2, 1960, Ser. No. 26,261
12 Claims. (Cl. 340—173.1)

This invention relates to information handling arrangements, and more particularly to improvements in information storage arrangements of the kind utilizing superconductive elements.

It is known that many materials lose all apparent electrical resistance when they are subjected to very low temperatures, in the vicinity of absolute zero. A material exhibiting this characteristic property is called a superconductor and the related phenomenon is termed superconductivity. The transition from the resistive state to the superconductive state occurs abruptly at a critical temperature known as the transition temperature, the particular temperature differing for each material. It is also known that a transistion from a superconducting to a resistive state can be induced in a superconductor by applying a magnetic field to the superconductor. The magnetic field can be applied externally to the superconductor or it can be induced internally by the flow of electric current through the superconductor. In the presence of an external magnetic field, a superconductor requires less directly applied current, termed the critical current, to cause a transition than it does when there is no external magnetic field present.

The ability of a superconductor to change its state between the superconducting and the normal or resistive states has been utilized in various superconductive computer arrangements, such as gating devices and memory circuits, to perform many of the computer functions which, until recently, were carried out exclusively by more bulky and complicated non-superconductive circuit components. For example, it has been proposed to form a matrix of memory cells from an array of superconductive flip-flops. However, one disadvantage of such a proposed arrangement is the relatively large number of gating elements required to gain access to the flip-flops. Other proposals which achieve a reduction in the number of gating elements suffer from the disadvantages of requiring a high degree of uniformity in the superconductive elements and very stringent control over the input currents.

Accordingly, it is an object of this invention to provide a superconductive information handling arrangement that is characterized by its relative compactness in size and simplicity of construction.

Another object of this invention is to provide a superconductive information handling arrangement that is relatively insensitive to superconductive element structural non-uniformities.

A further object of this invention is to provide a superconductive information handling arrangement that permits wider tolerances on the input currents applied thereto.

The foregoing and other objects are realized in connection with one of the known superconductive information handling arrangements of the kind including a matrix of superconductive memory cells. In such an arrangement, each of the cells in the matrix is arranged to be addressed by the coincidence of two signals applied to the cell. Each cell comprises a superconductive circuit loop including a switching portion, capable of change between a superconducting state and a resistive state, and a superconducting inductance portion. The superconductive loop is capable of sustaining a persistent circulating memory current only when both the switching portion and the inductance portion are superconducting.

In the arrangement two superconductive control circuits are coupled to the loop. According to the invention, the first of the two control circuits is substantially non-inductively coupled to the superconductive circuit loop, but is oriented to control the state of the switching portion by impressing a magnetic field directly on the switching portion. A non-inductive magnetic coupling may be regarded as a coupling which can induce a current only in localized regions of the loop, but not around the entire loop. The second control circuit is inductively coupled to the inductance portion; this second control circuit is capable of inducing (within the superconductive loop) a persistent current when the switching portion is superconducting, or a transient current when the switching portion is resistive.

Information is handled by the matrix by a unique cycling of the signals applied to the control circuits during "read" and "write" periods, that is, periods during which information is taken from or fed to the memory cells.

As used throughout the specification and claims, an "inductive coupling" refers to a coupling, between a control circuit and an associated superconductive circuit loop, in which the ratio, between the mutual inductance of the control circuit and loop, and the self inductance of the loop, is relatively high, say for example, 50 percent or more. Conversely, a "non-inductive coupling" refers to a coupling in which the ratio, between the mutual inductance of the control circuit and loop, and the self inductance of the loop, is relatively small, say, for example, less than 1 percent.

The invention will be described in greater detail by reference to the accompanying three sheets of drawings, wherein like reference characters refer to like parts and wherein.

Since the arrangement of the invention is predicated upon certain effects peculiar to the phenomena of superconductivity, these effects will be discussed prior to a discussion of embodiments of the invention.

*Superconductive Phenomena*

At temperatures near absolute zero some materials apparently lose all resistance to the flow of electrical current and become what appear to be perfect conductors of electricity. This phenomenon is termed superconductivity and the temperature at which the change occurs, from a normally resistive state to the superconductive state, is called the transition temperature. For example, the following materials have transition temperatures, and become superconductive, as noted:

| | ° Kelvin |
|---|---|
| Niobium | 8 |
| Lead | 7.2 |
| Vanadium | 5.1 |
| Tantalum | 4.4 |
| Mercury | 4.1 |
| Tin | 3.7 |
| Indium | 3.4 |
| Thallium | 2.4 |
| Aluminum | 1.2 |

Only a few of the materials exhibiting the phenomenon of superconductivity are listed above. Other elements, and many alloys and compounds, become superconductive at temperatures ranging between 0° and around 20° Kelvin. A discussion of many such materials may be found in a book entitled "Superconductivity" by D. Schoenberg, Cambridge University Press, Cambridge, England, 1952.

The above-listed transition temperatures apply only where the materials are in a substantially zero magnetic field. In the presence of a magnetic field the transition temperature is decreased. Consequently, in the presence of a magnetic field a given material may be in an electrically resistive state at a temperature below the absence-of-magnetic-field or normal transition temperature. A discussion of this aspect of the phenomenon of superconductivity may be found in U.S. Patent 2,832,897, entitled "Magnetically Controlled Gating Element," granted to Dudley A. Buck.

In addition, the above-listed transition temperatures apply only in the absence of electrical current flow through the material. When a current flows through a material, the transition temperature of the material is decreased. In such a case the material may be in an electrically resistive state even though the temperature of the material is lower than the normal transition temperature. The action of a current in lowering the temperature at which the transition occurs (from a state of normal electrical resistivity to one of superconductivity) is similar to the lowering of the transition temperature by an external magnetic field, inasmuch as the flow of current itself induces a magnetic field.

Accordingly, when a material is held at a temperature below its normal transition temperature for a zero magnetic field, and is thus in a superconductive state, the superconductive condition of the material may be extinguished by the application of an external magnetic field or by passing an electric current through the material.

Figure 1:
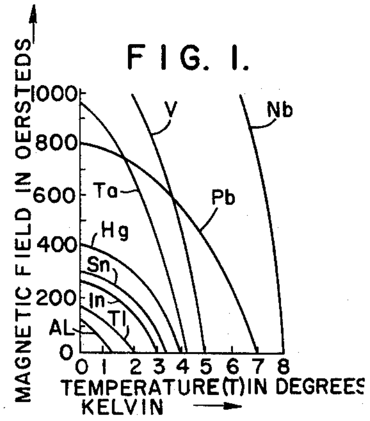
FIG. 1 is a graph illustrating the variation in transition temperatures for various materials as a function of the magnetic field to which they are subjected.

FIG. 1 illustrates the variation in transition temperatures (T) for several materials as a function of an applied magnetic field. In the absence of a magnetic field, the point at which each of the several curves intercepts the abscissa is the transition temperature at which the material becomes superconductive. (The transition temperature for each material varies almost parabolically with the magnetic field applied to it, as expressed by the function $$\frac{H_c}{H_0}=1-\left(\frac{T}{T_c}\right)^2$$

where $H_c$ is the critical magnetic field density for effecting a transition from the superconductive to the resistive state at any given temperature T, $H_0$ is the intercept of a curve on the ordinate axis, at zero degrees Kelvin, and $T_c$ is the transition temperature of the material in the absence of a magnetic field). The transition temperature is given in degrees Kelvin. A particular material is superconductive for values of temperature and magnetic field falling beneath each of the several curves, while for values of temperature and magnetic field falling above a curve, the material possesses electrical resistance.

Since a current flowing in the material has an effect upon the transition temperature that is similar to the effect of a magnetic field, the passage of a current through superconductive materials will yield curves similar to those shown in FIG. 1.

*Superconductive Memory Cell Matrix*

Figure 2:
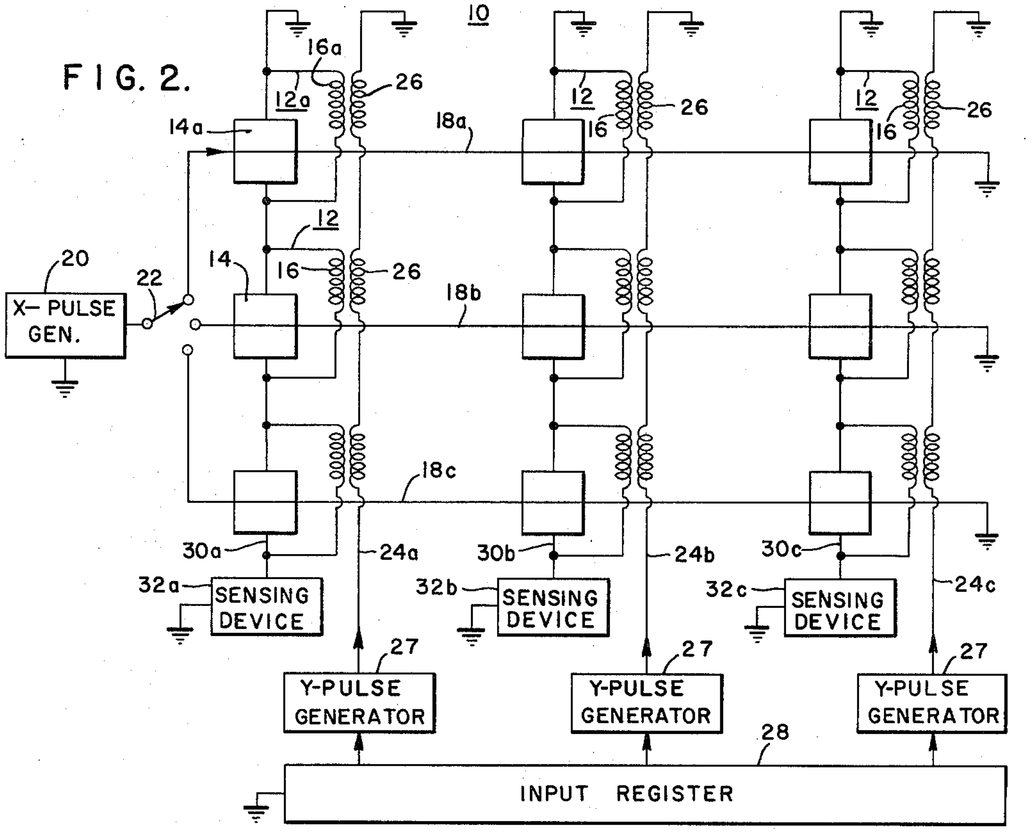
FIG. 2 is a schematic circuit of one form of superconductive memory cell matrix according to the invention.

FIG. 2 illustrates schematically an embodiment of the invention as applied to a matrix 10 of memory cells 12 arranged in two coordinate systems, such as in a two dimensional array. In one of the systems, the cells 12 are arranged in rows, and in the other system the cells 12 are arranged in columns. For purposes of illustration the matrix 10 is shown as a three by three array of cells 12, there being three rows of cells with each row containing three cells aligned in three columns. However, the number of cells can vary, depending on the amount of information to be handled by the array. Each of the cells 12 comprises a superconductive circuit loop including a switching portion 14 and an inductance portion 16. The switching portion 14 is capable of change between a superconducting state and a resistive state. The inductance portion 16 remains superconducting at all times.

Each of the cells 12 is arranged to be addressed by the coincidence of two signals applied from two groups of circuits. One of the signals is applied to all of the memory cells 12 in each row. This signal is called the horizontal or X-signal and is applied selectively through horizontally arranged row superconductors 18*a*, 18*b*, and 18*c*. Each of the superconductors 18*a* through 18*c* is coupled magnetically but substantially non-inductively to all of the switch elements 14 in a given row. Each of the row superconductors 18*a* through 18*c* may be selectively energized by individual connection to an X-signal current pulse generator 20, the selective energization being effected through an X-signal-selection switch 22 connected between the pulse generator 20 and the row superconductors 18*a* through 18*c*.

When an X-signal current is passed through one of the row superconductors, say superconductor 18*a*, a magnetic field is created about that superconductor 18*a* all along the length thereof. The magnetic field appearing in the vicinity of the switching portions 14 in that row of cells 12 operates on the switching portions 14 to change their state from superconducting to resistive. When the current is removed from that superconductor 18*a* all of the switching portions 14 revert to their superconducting state. Thus, each of the superconductive circuit loops comprising the memory cells 12 is capable of being changed between superconducting and resistive states in response to a magnetic field applied to the switching portion 14.

The other of the two signals is applied to all of the memory cells 12 in each column. This signal is called the vertical or Y-signal and is applied through vertically arranged column superconductors 24*a*, 24*b*, and 24*c*. Each of these superconductors 24*a* through 24*c* is inductively coupled to all of the inductance portions 16 in a given column. The inductive coupling is effected through inductive circuit elements 26 connected in series in each column superconductor, with each inductive element 26 disposed in current inducing relationship with an individual one of the inductance portions 16. Each of the column superconductors 24a through 24c receives separate energizing signals from a individual Y-signal current pulse generator 27. The Y-signal current pulse generators 27 are under the control of an input pulse register 20a, which is arranged to apply all of the separate Y-signals simultaneously according to a predetermined program. The row superconductors 18a–18c, column superconductors 24a–24c and inductive elements 26 are designed to remain superconducting during the operation of the matrix 10.

When a Y-signal is passed through one of the column superconductors, say superconductor 24a, a corresponding circulating current is induced in each of the superconductive memory cells aligned in a column and coupled to the column superconductor 24a. The induced current may be a persistent current which flows indefinitely as long as both the switching portion 14 and the inductance portion 16 making up the memory cell 12 are superconducting. If the switching portion 14 is in the resisitive state, however, the induced current will be a transient current that is damped out by the resistance of the switching portion 14. The state of each of the memory cells 12, that is, the fact of whether or not a persistent current is flowing in the cell, may be determined by measuring the voltage developed across the switching portion 14 in response to the application of a current pulse to the row superconductor coupled to the memory cell being interrogated. For this purpose, all of the switching portions 14 in a given column may be serially connected to form a plurality of output circuits 30a, 30b, 30c, and each of the output circuits may be connected to a voltage sensing device, such as the devices 32a, 32b, 32c.

Figure 3:
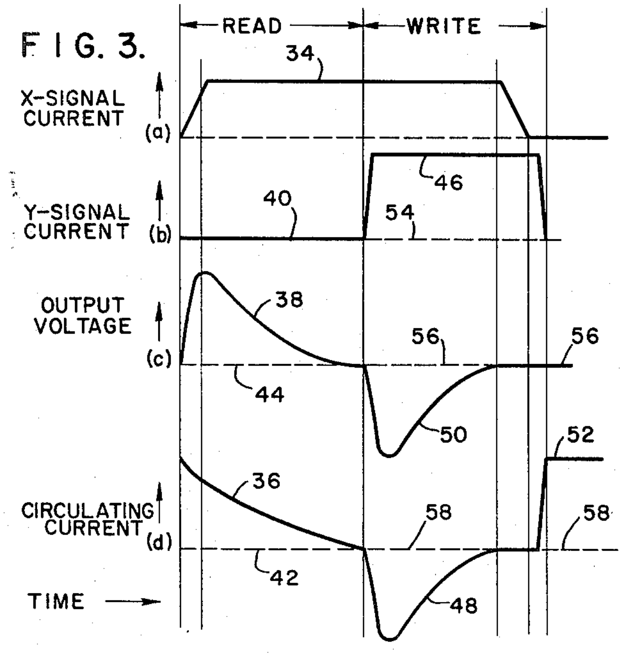
FIG. 3 is a graph of waveforms useful in describing the operation of the matrix of FIG. 2.

The operation of the memory matrix 10 will be described with the aid of FIG. 3 which is a graphic illustration of the current and voltage waveforms associated with a selected memory cell such as memory cell 12a (in the upper left-hand corner of FIG. 2) selected by row superconductor 18a and column superconductor 24a. Line (a) of FIG. 3 represents the X-signal current applied to the row superconductor 18a; line (b) represents the Y-signal current applied to the column superconductor 24a; line (c) represents the voltage developed across the output circuit 30a; and line (d) represents the circulating current flowing in the selected memory cell 12a. During the "read" cycle an X-signal current pulse 34 is applied to the row superconductor 18a. This current is of sufficient magnitude to insure that the switching portion 14a in the selected memory cell 12a is transformed to the resistive state, irrespective of whether or not a circulating current is flowing in that cell. The upper limit of this applied current pulse 34 is determined solely by that value of current which will cause the row superconductor 18a to transform from the superconducting to the resistive state. The presence of the resistance (switching portion 14a) in the superconductive memory loop will cause any persistent current that might be flowing in this loop to decay at a rate determined by the inductance resistance ($L/R$) time constant of the circuit, as indicated by waveform 36 in the left-hand portion of line (d). The decay of transient current 36 in the memory cell 12a causes a voltage pulse 38 to appear in the output circuit 30a, as shown in line (c). It is noted that during the "read" cycle no current is applied to the column superconductor 24a, so that the current 40 represented in the left-hand portion of line (b) remains at zero. If there had been no persistent current present in the memory cell 12a during the read cycle, the application of a current pulse to the row superconductor 18a would have resulted in a zero circulating current and a zero voltage output, as shown in the dotted portions 42 and 44 of lines (d) and (c), respectively.

At the end of the "read" cycle, a decision may be made as to whether to write in the same word of information as that previously written or whether to write in new information at the same address. This choice can be embodied in the external circuitry, as is well known. During the "write" cycle, the X-signal current pulse 34 applied to the row superconductor 18a is left on. In order to store a circulating current in the cell, the presence of which is represented by the binary digit 1, a Y-signal current pulse 46 is applied to the column superconductor 24a, as shown in the right-hand portion of line (b). Since the switching portion 14a is maintained resistive during the application of current to the row superconductor 18a, the circulating current induced within the memory cell 12a by virtue of the inductive coupling between the inductive element 26a and the inductance portion 16a, will be a transient current pulse 48, as shown in the right-hand portion of line (d). This transient current 48 will decay according to the $L/R$ time constant of the memory cell circuit. During this same time interval, a voltage pulse 50 will appear in the output circuit, as shown in the right-hand portion of line (c).

After the circulating current 48 in the memory cell 12a has decayed to substantially zero, the current pulse 34 applied to the row superconductor 18a is terminated, whereupon the switching portion 14a reverts to its superconducting state. After the current in the row superconductor 18a has been reduced to zero, the current pulse 46 applied to the column superconductor 24a is terminated, whereupon a new circulating current 52, shown in the right-hand portion of line (d), is induced in the memory cell 12a, the new circulating current 52 having a polarity opposite that of the previously induced transient current 48. Since the entire memory cell 120 is now superconducting, the newly induced current 52 will be a persistent or stored current, as shown in the right-hand portion of line (d).

If, at the end of the "read" cycle, it is desired not to store a circulating current in the memory cell, the absence of current being represented by the binary digit 0, no current pulse is applied to the column superconductor as shown in the dotted portion 54 of line (b). In this case, both the output voltage and the circulating current will be zero during the entire "write" cycle, as shown in the dotted portions 56 and 58 of lines (c) and (d), respectively.

The limitation on the magnitude of the Y-signal current pulse applied to each of the column superconductors 24a–24c is determined by the effect this pulse has upon a nonselected memory cell 12, that is, a cell that is subjected to the same column superconductor current (Y-signal current) as the selected cell but is not simultaneously subjected to a row superconductor current (X-signal current). It is essential that the Y-signal current pulse neither extinguish nor degrade a memory current that might be stored in the nonselected memory cell, nor should it cause a memory current to be induced where none was formerly present. The effect of a Y-signal current pulse on the memory cell will now be examined for each of these two situations. In the case where no memory current was previously stored, the application of a Y-signal current pulse to the column superconductor will induce a negative circulating current in the nonselected memory cell, negative in the sense that its direction is opposite to the direction of flow that a stored current will have when it is present in the cell. The induced circulating current will be a negative persistent current. It will be seen that this negative persistent current must be insufficient to transform the switching portion, else it would change the state of the cell. This sets the upper limit on the magnitude of the current pulse applied to the column superconductor. When the Y-signal current pulse is removed from the column superconductor, a positive circulating current is induced in the cell. This positive circulating current will cancel the negative persistent circulating current, thereby returning the cell to its previous condition of zero stored current.

In the case where the cell did contain a previously stored current, the application of a Y-signal current pulse to the column superconductor will, as in the first case, induce a negative circulating current in the nonselected memory cell. However, the induced current will substantially cancel the previously stored current (the two currents being substantially equal and opposite). When the Y-signal current pulse is terminated, a positive persistent circulating current will be induced in the memory cell. The persistent current will have the same magnitude and direction as the previously stored current. Thus in this case, as in the first, the memory cell is restored to its original state provided the requirement limiting the magnitude of the Y-signal current pulse is fulfilled.

Although there is a definite upper limit on the magnitude of the Y-signal current pulse there is no definite lower limit. A current pulse of smaller magnitude than the maximum permissible value will merely cause a smaller stored current in the selected cell and hence a smaller output signal, the output being linearly dependent on the Y-signal current pulse magnitude. Thus, the only requirement on the minimum permissible value of the Y-signal current pulse is that it produce a useable output signal.

Figures 4, 5, 6, 7:
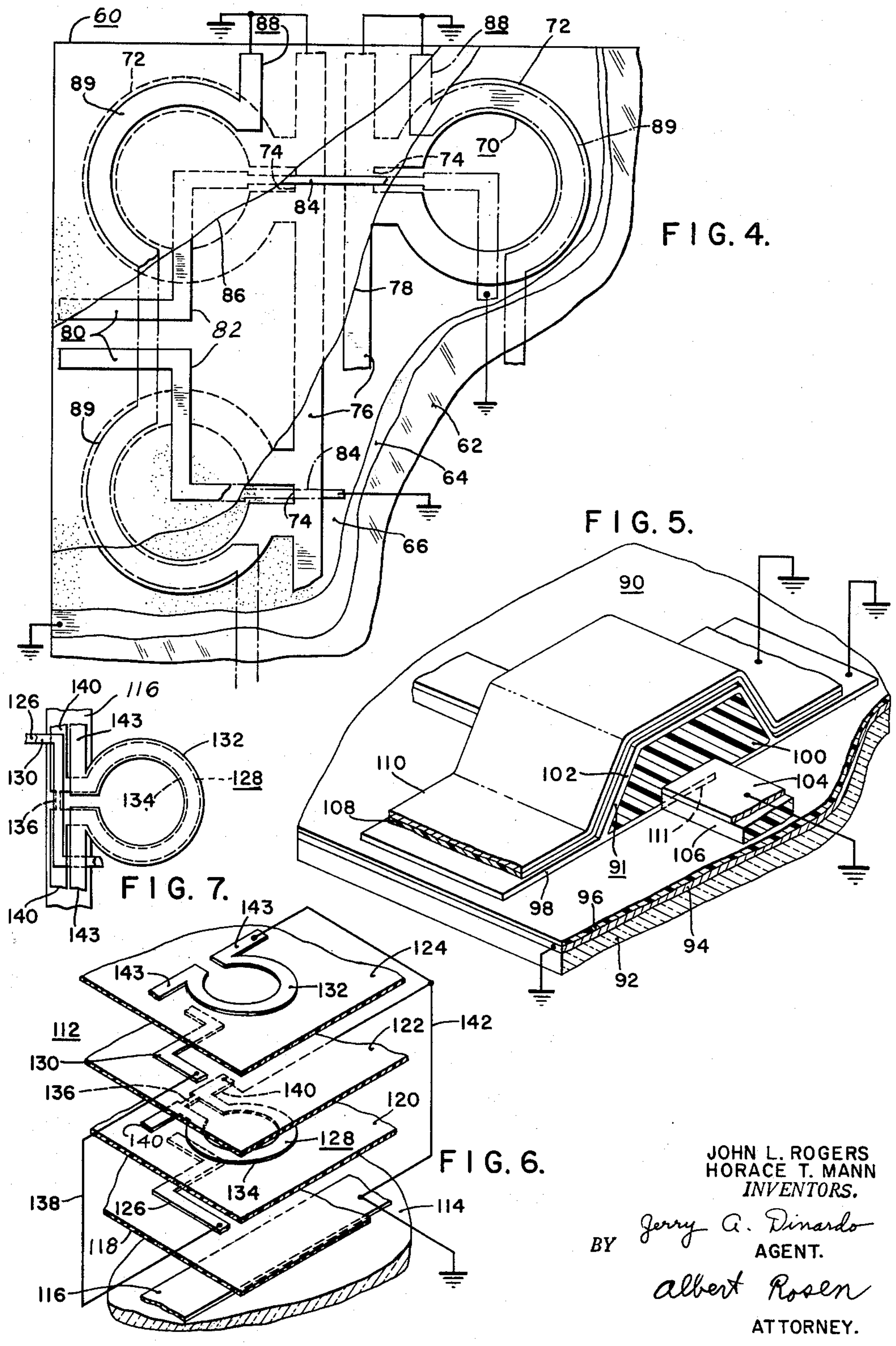
FIG. 4 is an enlarged plan view of a portion of a memory cell matrix structure constructed in accordance with the invention.
FIG. 5 is an enlarged, fragmentary, perspective view of a portion of another form of memory cell matrix structure showing the construction of a single memory cell.
FIG. 6 is an exploded view showing the construction of another form of memory cell according to the invention.
FIG. 7 is a plan view of the memory cell structure shown in FIG. 6.

FIG. 4 shows a memory cell matrix structure 60 embodying the foregoing circuit features. For simplicity, only three cells are shown to indicate a general pattern, it being understood that the pattern can be repeated for as many cells as is desired in a given matrix. The matrix structure 60 comprises an insulating plate 62 of either glass, quartz, or ceramic, coated on one surface thereof with alternate layers of thin film superconductors and insulation films. The plate 62 is coated with a superconductive sheet 64, hereinafter called a ground plane sheet. The ground plane sheet 64 serves as a common ground return for other members of the matrix structure 60. The ground plane sheet 64 is covered on the major surface portions thereof with an insulation sheet 66.

An array of memory cells 70 in the form of loop-shaped superconductors is supported on the insulation sheet 66. The main body of each cell 70 generally is a circular loop portion 72 constituting the inductance portion of the cell 70. The switching portion of the cell 70 is constituted by a relatively short superconductive strip 74 bridging the gap across the ends of the loop portion 72. All of the switching portion strips 74 in a given column are conductively interconnected by vertically extending output superconductive strips 76. The memory cells 70 are covered with an insulation sheet 78. The next superconductor layer supported on the insulation sheet 78 comprises an array of horizontally extending sinuous X-signal current superconductors 80. Each of the X-signal current superconductors 80 includes a plurality of relatively wide strips 82 interconnected by a plurality of relatively narrow strips 84. The array of X-signal current superconductors 80 is covered with an insulation sheet 86. The insulation sheet 86 is coated with an array of vertically extending Y-signal current superconductors 88, with each of the superconductors 88 having arcuate portions 89 registered with an appreciable part of each of the loop portions 72 in a given column. Each arcuate portion 89 serves as an inductive coupling element relative to the cell 70. For the sake of conserving space and thereby reducing the size of the array, the memory cells 70 may be arranged in an alternating pattern along the horizontal dimension as shown.

In the operation of the memory cell matrix, a current flowing through the X-signal current superconductor 80 operates to change the state of the switching portion 74 by impressing a magnetic field at the intersection of the switching portion 74 with the narrow superconductive strip 84. The presence of the ground plane 64 restricts the magnetic field caused by current flowing in the X-signal current superconductor 80 to essentially the region between the superconductor 80 and the ground plane 64. Thus appreciable inductive coupling between the X-signal current superconductor 80 and the superconductive circuit loop comprising the cell 70 can occur only in regions where the superconductor 80 and cell 70 are registered with each other. However, in the regions where they are registered, such as at the intersection of the narrow strip 84 with the switching portion 74, and at the intersection of wide strip 82 with the loop portion 72, the superconductor 80 extends normal to the cell 70. That is, they are normal to each other along directions of current flow through the cell 70 and superconductor 80, and are thus substantially non-inductively coupled to each other. For this reason current flowing through the superconductor 80 will not induce current flow around the cell 70. Although a magnetic field is also present at the intersection of the wide strip 82 with the loop portion 72, the density of this field is much smaller than the field at the intersection of the narrow strip 84 with the switching portion 74, because of the substantial width of the wide strip 82 relative to the narrow strip 84. Accordingly, the loop portion will not change in state in the area of this smaller field. The width of the narrow superconductive strip 84 can be made substantially smaller than the width of the switching portion 74 to reduce the magnitude of the X-signal current required to cause the switching portion 74 to transform. Because the narrow superconductive strip 84 crosses the switching portion 74 at right angles, the magnetic field need only be concentrated in a narrow band across the width of the switching portion 74 to cause it to transform.

The application of current to the Y-signal current superconductor 88 will cause a circulating current to be induced within the memory cell loop. The induced current will be a persistent current if the switching portion 74 is superconducting, or it will be a transient current if the switching portion 74 is resistive. The arcuate portion 89 of the Y-signal current conductor 88 and the loop portion 72 of the cell 70 lie parallel to each other, in the directions of current flow therethrough, and therefore they couple to each other inductively. Since an appreciable portion of the memory cell 70 is registered with the arcuate portion 89, the mutual inductance of the superconductor 88 and the cell is a relatively high portion of the self inductance of the cell 70, and a significant current can be induced within the memory cell 70. The presence or absence of memory cell current is sensed in the output circuit comprised of the series connected switching portions 74.

All of the superconductors of the matrix structure 60 except the switching portion strip 74 may be formed of a superconductive material, such as lead or niobium, that has a relatively higher transition temperature than the material, such as tin or indium, of the switching portion strip 74. This will insure that all of the superconductors except the switching portion 74 will remain in the superconducting state during the operation of the matrix under relatively high current operating conditions. However, because of the previously discussed non-inductive orientation of elements, it is feasible to construct the switching and loop portions 74 and 72 from the same superconductive material and with the same cross-sectional dimensions, with the assurance that the loop portions will remain superconducting while the switching portion is transformed. In general, it is desirable to make the switching portion as thin as possible, inasmuch as the switching speed increases as the film thickness is reduced. For example, the switching speed of an indium film that is 1 micron in thickness is of the order of 10 millimicroseconds, and faster speeds are realizable for thicknesses less than .1 micron. Thin films of such small order of thickness may be made by vacuum deposition methods. The insulation layers may also be formed by vacuum deposition of a material such as silicon monoxide.

FIG. 5 shows a different memory cell matrix structure 90 embodying the circuit features of the invention. For simplicity only one memory cell 91 is shown. The matrix structure 90 comprises an insulating plate 92 supporting a ground plane coating 94 on one surface thereof and an insulating sheet 96 on the ground plane sheet 94. The insulation sheet 96 is coated with a relatively wide output superconductive strip 98, a portion of which is coated with a relatively thick insulation layer 100. The relatively thick insulation layer 100 is coated with a superconductive element 102 which merges with the output superconductive strip 98 to form a sheath of superconductive material surrounding the thick insulation layer 100. Extending through the thick insulation layer 100 and across the output superconductive strip 98 is a relatively narrow X-signal superconductive strip 104. The X-signal superconductive strip 104 is spaced only a slight distance from the output superconductive strip 98 by a thin film insulation strip 106. The superconductive element 102 and output superconductive strip 98 are coated in turn with an insulation strip 108 and with a Y-signal current superconductive strip 110. One end of each of the superconductive strips 98, 104, and 110 is connected to the ground plane coating 94, as shown by the ground connections to those strips.

The memory cell 91 is constituted by the closed sheath of superconductive material surrounding the thick insulation layer 100. The portion 111 of the output superconductive strip 98 in close proximity to and registered with the narrow X-signal current superconductive strip 104 constitutes the switching portion of the cell 91. The remaining portion of the superconductive sheath, including the superconductive element 102, constitutes the inductance portion of the memory cell 91. The superconductive sheath forming the superconductive memory cell loop is oriented in a plane that is normal to the support plate 92. By the same token, the flow of current in the memory cell 91 will follow a path defining a plane that is normal to the support plate 92.

In the operation of the memory cell 91, a current flowing through the X-signal current superconductive strip 104 creates a magnetic field surrounding the strip 104. The presence of the ground plane 94 causes the magnetic field to be substantially confined to the region between the strip 104 and the ground plane 94. Hence, it will be seen that, with respect to the superconductive circuit loop, the switching portion 111 will be subjected to a high concentration of magnetic field, whereas other portions will be subjected to considerably less magnetic field. Thus, provided the X-signal current is of sufficient magnitude, the resulting field will cause a transformation between superconductive and resistive states of the switching portion 111 only. The X-signal current superconductive strip 104 may be said to be inductively coupled to the switching portion 111 because it can induce current locally within the switching portion 111. However, the X-signal superconductive strip 104 is non-inductively coupled to the superconductive circuit loop taken as a whole, because it can not induce currents around the entire superconductive loop.

On the other hand, the Y-signal current superconductive strip 110 extends along the circuit path defined by the superconductive element 102 rather than transversely thereof, and is therefore inductively coupled to the superconductive circuit loop. Thus, the application of current of the Y-signal current superconductive strip 110 will cause a circulating current to be induced within the memory cell loop. The circulating current will be a persistent current if the switching portion 111 is superconducting, or it will be a transient current if the switching portion 111 is resistive.

FIG. 6 shows an exploded view of another structural arrangement of the memory cell matrix of the invention. The matrix structure 112, a portion of which is shown, is in the form of alternate layers of thin film superconductors and insulation sheets disposed on an insulating support 114 to form an array of memory cells and circuits therefor. Each elemental portion of the array includes a first relatively wide superconductive ground plane strip 116 disposed on the support 114. On successive insulation sheets 120, 122, and 124 are disposed a first bent superconductor 126, a memory cell 128, a second bent superconductor 130, and a generally circular inductance element 132. The memory cell 128 comprises a generally circular inductance portion 134 and a relatively shorter switching portion 136 joined to the ends of the inductance portion 134. As shown more clearly in the plan view of FIG. 7, the inductance portion 134 and inductance element 132 are mounted in register with each other for maximum inductive coupling. The two bent superconductors 126 and 130 are also mounted in register with each other, with the switching portion 136 sandwiched therebetween and aligned therewith.

Referring again to FIG. 6, the two bent superconductors 126 and 130 are connected together at one of their ends, indicated by the connection line 138, to form one X-signal current superconductor folded around the switching portion 136, so that a current passing through the superconductors 126 and 130 can generate a magnetic field capable of changing the superconductive state of the switching portion 136. Two strip superconductors 140 extend from the ends of the switching portion 136 and in register with the ground strip 116 on the support 114. One of the strip superconductors 140 is connected to one end of the ground strip 116, indicated by the connection line 142, to form one folded output superconductor connected across the switching portion 136. The ground strip 116 is also connected to one of two strip superconductors 143 extending from the inductance element 132 to form a folded Y-signal current superconductor.

The presence of a ground plane in close proximity to a portion of a circuit considerably reduces the self-inductance of that portion. Hence, in this embodiment, the self-inductance of the memory cell 128 is essentially that of the portion of the cell 128 not registered with the ground plane strip 116. The effect of a ground plane on the mutual inductance of two circuits likewise is to considerably reduce the mutual inductance of the two circuits. Hence the mutual inductance of the Y-signal superconductors 143 and the memory cell 128; lying in the regions registered with the ground plane strip 116 is very low. As a result, the inductive coupling between the memory cell 128 and the Y-signal current superconductor (strips 143 and inductive element 132) is made very tight; that is, the mutual inductance between the Y-signal current superconductor and the memory cell 128 is substantially equal to the self-inductance of the cell 128. Similarly, the presence of the ground plane strip 116 serves to reduce the mutual inductance between the Y-signal superconductor and the output superconductor (strips 140).

The inductive coupling between one of the bent superconductors 130 and the memory cell 128 is substantially equal and opposite to the inductive coupling between the other bent superconductor 126 and the memory cell 128. Hence the X-signal superconductor comprising the bent superconductors 126 and 130 is substantially non-inductively coupled to the memory cell 128.

An advantage of using a parallel orientation of X-signal current conductor (superconductors 126 and 130) and switching portion 136 is that a higher output resistance can be obtained, because of the greater switching length of the switching portion 136, and thus a higher output voltage is obtainable.

Figure 8:
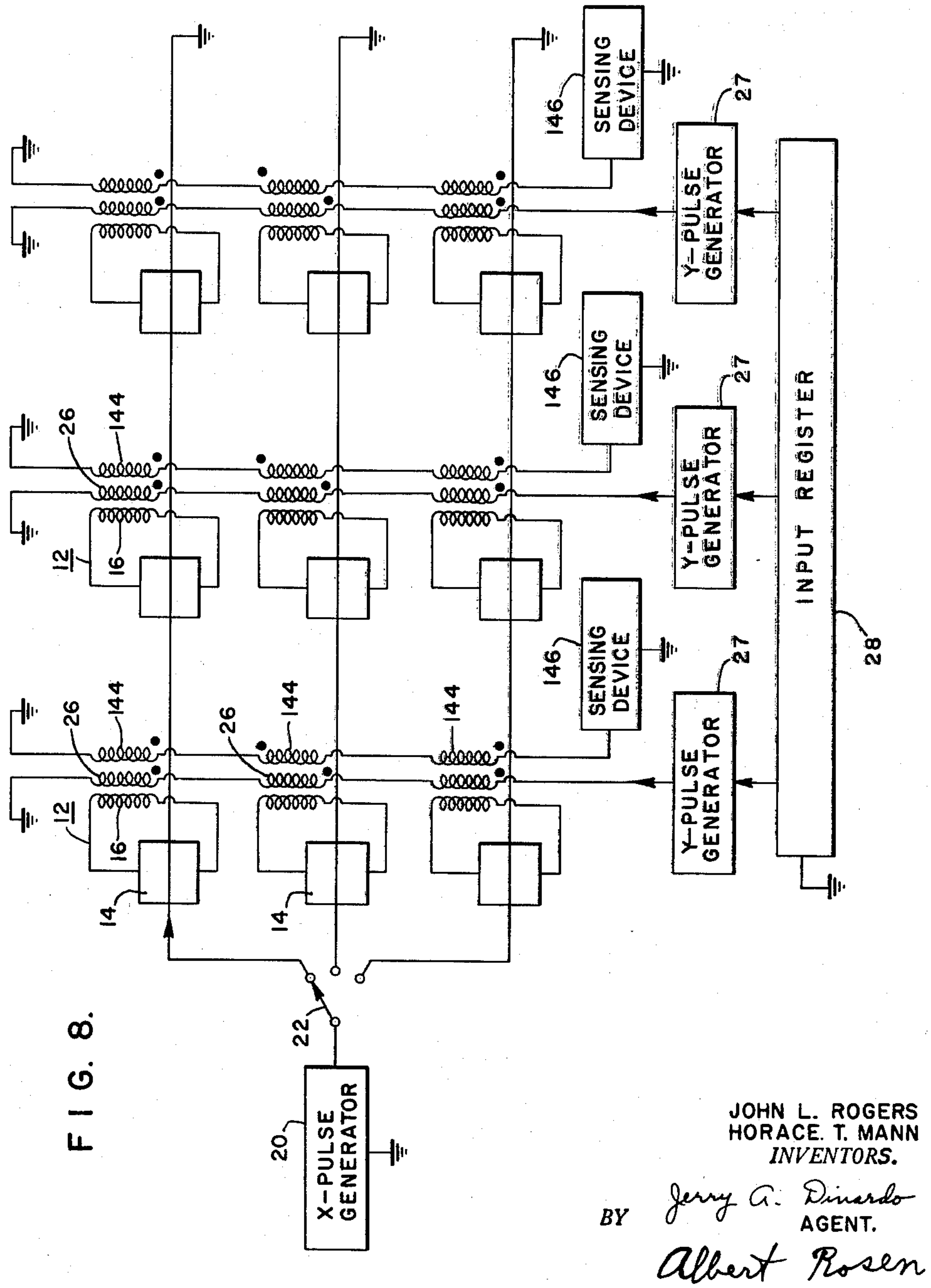
FIG. 8 is a schematic circuit illustrating another form of superconductive memory cell matrix according to the invention.

FIG. 8 illustrates schematically another embodiment of the invention in which the output is taken across a separate circuit that is inductively coupled to the memory cell. In this embodiment, the output conductor 30*a*–30*c* of FIG. 2 are omitted, and an output inductive element 144 similar to the inductive element 26 of the column conductors 24*a*–24*c* is coupled to the inductance portion 16 of each memory cell 12. All of the output inductive elements 144 of a column are connected in series with a sensing device 146. Any change in the state of the circulating current of the memory cell 12 will induce a current in the output inductive element 144, the presence of which curent is sensed by the sensing device 146 to indicate the presence of circulating current in the memory cell. Otherwise the operation is similar to that described in connection with FIG. 2. In this embodiment, it is preferred to alternate the polarity of the coupling between the Y-signal current inductive element 26 and the output inductive element 144, as shown, in order to eliminate output currents resulting from inductive coupling between these inductive elements 26 and 144.

It is now apparent that the objectives of achieving structural simplicity, ease of construction, relative insensitivity to superconductive thin film element non-uniformities, and wider permissible input current tolerances are fulfilled by the information handling arrangement of the invention.

What is claimed is:

1. A superconductive information handling arrangement, comprising: a superconductive memory device having a switching portion and an inductance portion connected in a closed superconductive circuit loop, said switching portion being capable of change between superconducting and resistive states, and said loop being capable of sustaining a persistent circulating current when said switching portion and said inductance portion are in the superconducting state; a first control circuit magnetically coupled to said switching portion and operable to control the state of said switching portion in response to a signal current applied to said first control circuit, said first control circuit being substantially non-inductively coupled to said loop, and a second control circuit inductively coupled to said inductance portion and to said loop and operable to induce within said loop, in response to a signal current applied to said second control circuit, a circulating current that is transient when said switching portion is in the resistive state and that is persistent when said switching portion is in the superconducting state.

2. A superconductive information handling arrangement, comprising: a superconductive memory cell having a switching portion and an inductance portion connected in a closed superconductive circuit loop, said switching portion being capable of change between superconducting and resistive states, and said loop being capable of sustaining a persistent circulating current when said switching portion is in the superconducting state; a first control circuit magnetically coupled to said switching portion and operable to control the state of said switching portion in response to a signal current applied to said first control circuit, said first control circuit being substantially non-inductively coupled to said loop; a second control circuit inductively coupled to said inductance portion and said loop and operable to induce within said loop, in response to a signal current applied to said second control circuit, a circulating current that is transient when said switching portion is in the resistive state and that is persistent when said switching portion is in the superconducting state; and an output circuit coupled to said loop for indicating the presence of circulating current in said loop.

3. A superconductive information handling arrangement according to claim 2, wherein said output circuit is connected across said switching portion.

4. A superconductive information handling arrangement according to claim 2, wherein said output circuit includes an inductive element coupled to said inductance portion.

5. A superconductive information handling arrangement, comprising: an array of superconductive memory cells each having a switching portion and an inductance portion connected in a closed superconductive circuit loop, said switching portion being capable of change between superconducting and resistive states, and said loop being capable of sustaining a persistent circulating current when said switching portion is in the superconducting state; a first control circuit magnetically coupled to each of said switching portions and operable to control the state of said switching portion in response to a signal current applied to said first control circuit, said first control circuit being substantially non-inductively coupled to said loop; and a second control circuit inductively coupled to each of said inductance portions and said loops and operable to induce within said loop, in response to a signal current applied to said second control circuit, a circulating current that is transient when said switching portion is in the resistive state and that is persistent when said switching portion is in the superconducting state.

6. A superconductive information handling arrangement, comprising: an array of superconductive memory cells arranged in two coordinate systems, each cell having a switching portion and an inductance portion connected in a closed superconductive loop, said switching portion being capable of change between superconducting and resistive states, and said loop being capable of sustaining a persistent circulating current when said switching portion is in the superconducting state; a first control circuit associated with a first group of cells in one of said systems and magnetically coupled to all of the switching portions of the cells in said first group and operable to control the state of said switching portions in response to a signal current applied to said first control circuit, said first control circuit being substantially non-inductively coupled to the loops in said first group; and a second control circuit associated with a second group of cells in the other of said systems and inductively coupled to all of the inductance portions and loops of the cells in said second group, said second control circuit being operable to induce within the loop of a cell selected by said first and second control circuits and in response to a signal current applied to said second control circuit, a circulating current that is transient when the switching portion of said selected cell is in the resistive state and that is persistent when the switching portion of said selected cell is in the superconducting state.

7. A superconductive information handling arrangement according to claim 6, and further including an output circuit coupled to all of the cells in said second group.

8. A superconductive information handling arrangement according to claim 7, wherein said output circuit includes a plurality of inductive elements, with each inductive element coupled to a different one of the inductance portions and loops in said second group.

9. A superconductive information handling arrangement according to claim 8, wherein said second control circuit includes a plurality of inductive elements coupled to the inductance portions and loops of the cells in said second group, the inductive elements of said second control circuit and the inductive elements of said output circuit being arranged to minimize the mutual inductive coupling between said second control circuit and said output circuit.

10. A superconductive structure, comprising: a closed loop of thin film superconductive material, with the path of the loop defining a given plane; a first thin film superconductor mounted adjacent to and registered with a first minor portion of said loop, said first superconductor being electrically insulated from said minor portion and forming a substantially non-inductive coupling with said loop; said first superconductor being magnetically coupled to said minor portion and operable to control the superconducting state thereof in response to signal current applied to said first superconductor; and a second thin film superconductor mounted adjacent to said loop and extending parallel to the path of said loop along and in register with a second major portion of the loop, thereby forming an inductive coupling between said second superconductor and said loop; said second thin film superconductor being operable to induce within said loop, in response to signal current applied to said second superconductor, a circulating current that is transient when said minor portion is resistant and that is persistent when said minor portion is superconducting.

11. A superconductive structure according to claim 10 wherein said first superconductor comprises two parallel strip superconductors mounted on opposite sides of said first portion of the loop.

12. A superconductive structure according to claim 10 wherein said first and second portions are formed of different superconductive material, with the material of said first portion having a lower transition temperature than the material of said second portion.

References Cited in the file of this patent

UNITED STATES PATENTS

| | | |
|---|---|---|
| 2,877,448 | Nyberg | Mar. 10, 1959 |
| 2,913,881 | Garwin | Nov. 24, 1959 |
| 2,914,735 | Young | Nov. 24, 1959 |
| 3,043,512 | Buckingham | July 10, 1962 |

OTHER REFERENCES

An Analysis of the Operation of a Persistent-Superconductive Memory Cell, by R. L. Garwin. IBM Journal, October 1957, pages 304 to 308.